United States Patent
Reeves et al.

(10) Patent No.: US 12,070,965 B2
(45) Date of Patent: Aug. 27, 2024

(54) INK, TRANSFERS, METHODS OF MAKING TRANSFERS, AND METHODS OF USING TRANSFERS TO DECORATE PLASTIC ARTICLES

(71) Applicant: POLYFUZE GRAPHICS CORPORATION, Clarkdale, AZ (US)

(72) Inventors: Robert A. Reeves, Flagstaff, AZ (US); Michael J. Stevenson, Sedona, AZ (US); Corey R. Dibrom, Cottonwood, AZ (US)

(73) Assignee: The Michael and Kathleen Stevenson Family Limited Partnership, Clarkdale, AZ (US)

( * ) Notice: Subject to any disclaimer, the term of this patent is extended or adjusted under 35 U.S.C. 154(b) by 922 days.

(21) Appl. No.: 15/734,518

(22) PCT Filed: Jun. 11, 2019

(86) PCT No.: PCT/US2019/036548
§ 371 (c)(1),
(2) Date: Dec. 2, 2020

(87) PCT Pub. No.: WO2019/245802
PCT Pub. Date: Dec. 26, 2019

(65) Prior Publication Data
US 2021/0229478 A1    Jul. 29, 2021

Related U.S. Application Data

(60) Provisional application No. 62/686,314, filed on Jun. 18, 2018.

(51) Int. Cl.
| | |
|---|---|
| C09D 11/00 | (2014.01) |
| B41M 5/035 | (2006.01) |
| B41M 5/52 | (2006.01) |
| C09D 11/033 | (2014.01) |
| C09D 11/106 | (2014.01) |
| C08K 3/04 | (2006.01) |
| C08K 3/36 | (2006.01) |
| C08K 5/3415 | (2006.01) |
| C08L 23/06 | (2006.01) |

(52) U.S. Cl.
CPC ........ *B41M 5/0356* (2013.01); *B41M 5/0355* (2013.01); *B41M 5/5254* (2013.01); *C09D 11/033* (2013.01); *C09D 11/106* (2013.01); *C08K 3/04* (2013.01); *C08K 3/36* (2013.01); *C08K 5/3415* (2013.01); *C08L 23/06* (2013.01); *C08L 2207/062* (2013.01)

(58) Field of Classification Search
CPC .............. B41M 5/0256; B41M 5/0355; B41M 5/5254; C09D 11/033; C09D 11/106; C08K 3/04; C08K 3/36; C08K 5/3415; C08L 23/06; C08L 2207/062

USPC ........................................... 106/31.01, 31.13
See application file for complete search history.

(56) References Cited

U.S. PATENT DOCUMENTS

| | | | |
|---|---|---|---|
| 4,252,762 A | 2/1981 | Stevenson | |
| 4,466,994 A | 8/1984 | Hubbard et al. | |
| 4,519,972 A | 5/1985 | Stevenson | |
| 4,536,434 A | 8/1985 | Magnotta | |
| 4,731,401 A | 3/1988 | Moteki et al. | |
| 4,910,081 A * | 3/1990 | Yamaguchi | B41M 5/395 524/508 |
| 5,133,820 A | 7/1992 | Katayama et al. | |
| 5,330,961 A | 7/1994 | Takeyama et al. | |
| 5,462,788 A | 10/1995 | Ohashi et al. | |
| 5,496,307 A | 3/1996 | Stevenson | |
| 5,611,881 A | 3/1997 | Kimura et al. | |
| 5,746,961 A | 5/1998 | Stevenson | |
| 5,840,142 A | 11/1998 | Stevenson | |
| 5,889,083 A | 3/1999 | Zhu | |
| 6,149,747 A | 11/2000 | Lorenz et al. | |
| 6,159,568 A | 12/2000 | Freedman | |
| 6,231,964 B1 | 5/2001 | Miller et al. | |
| 6,436,592 B1 | 8/2002 | Yau et al. | |
| 6,468,379 B1 | 10/2002 | Naito et al. | |
| 6,991,261 B2 | 1/2006 | Dronzek | |
| 7,086,726 B2 | 8/2006 | Takashima et al. | |
| 8,349,917 B2 | 1/2013 | Stevenson et al. | |

(Continued)

FOREIGN PATENT DOCUMENTS

| | | | | |
|---|---|---|---|---|
| CN | 108349284 A | * | 7/2018 | ............ B41M 5/502 |
| EP | 0673791 | | 9/1995 | |

(Continued)

OTHER PUBLICATIONS

Extended Search Report dated May 11, 2022 in EP Application No. 19823006.2.
Office Action dated Mar. 31, 2022 in Japanese Application No. 2020-568501.
AUIPO; Examination Report dated Dec. 22, 2020 in AU Application No. 2019290457.
AUIPO; Notice of Allowance dated Feb. 23, 2021 in AU Application No. 2019290457.
USPTO; Restriction Requirement dated Feb. 16, 2012 in U.S. Appl. No. 12/804,794.
USPTO; Office Action dated Apr. 3, 2012 in U.S. Appl. No. 12/804,794.

(Continued)

*Primary Examiner* — James E McDonough
(74) *Attorney, Agent, or Firm* — SNELL & WILMER L.L.P.

(57) ABSTRACT

A thermal indicia transfer comprises a fixing layer between a carrier sheet and a printed ink layer. The ink comprises plastic particles, a solvent, an indicia additive, a dispersing agent, and optionally a binder. The fixing layer is coated onto the carrier sheet and cured. The ink layer is printed onto the fixing layer where the plastic particles are held in place by the tackiness and structure of the fixing layer. The printed ink layer is dried at a temperature high enough to remove the solvent from the ink layer, but low enough to prevent melting of the plastic particles.

6 Claims, No Drawings

(56) References Cited

U.S. PATENT DOCUMENTS

| | | | |
|---|---|---|---|
| 2003/0068477 A1 | 4/2003 | Nakanishi et al. | |
| 2003/0113517 A1 | 6/2003 | Imamura et al. | |
| 2007/0022904 A1 | 2/2007 | Kitawaki et al. | |
| 2007/0254116 A1 | 11/2007 | Laprade | |
| 2009/0244146 A1 | 10/2009 | Chiwata | |
| 2009/0311426 A1 | 12/2009 | Nakazawa et al. | |
| 2012/0024448 A1* | 2/2012 | Stevenson | C09D 11/108 427/256 |

FOREIGN PATENT DOCUMENTS

| | | | |
|---|---|---|---|
| EP | 1016544 B1 * | 10/2008 | B41M 5/52 |
| GB | 1176937 | 1/1970 | |
| JP | 296357 | 10/1954 | |
| JP | 4936963 | 10/1974 | |
| JP | 6254775 | 3/1987 | |
| JP | 62143983 | 6/1987 | |
| JP | 62143984 | 6/1987 | |
| JP | 64077580 | 3/1989 | |
| JP | 10297125 | 11/1998 | |
| JP | 11310738 | 9/1999 | |
| JP | 200176850 | 3/2001 | |
| JP | 2002254896 A * | 9/2002 | B41J 2/01 |
| JP | 201047670 | 3/2010 | |
| WO | 199822226 | 5/1998 | |
| WO | 200050248 | 8/2000 | |
| WO | 2011135763 | 11/2011 | |

OTHER PUBLICATIONS

USPTO; Final Office Action dated Jul. 13, 2012 in U.S. Appl. No. 12/804,794.
USPTO; Notice of Allowance dated Sep. 21, 2012 in U.S. Appl. No. 12/804,794.
ISA; International Search Report and Written Opinion dated Dec. 12, 2011 in PCT Application No. PCT/US2011/001334.
ISA; International Preliminary Report on Patentability dated Jan. 29, 2013 in PCT Application No. PCT/US2011/001334.
AUIPO; Examination Report No. 1 dated Jan. 23, 2015 in Australian Application No. 2011283157.
AUIPO; Notice of Acceptance dated Sep. 8, 2015 in Australian Application No. 2011283157.
NZIPO; First Examination Report dated Sep. 13, 2013 in New Zealand Application No. 602810.
NZIPO: Further Examination Report and Postponed Acceptance dated Aug. 22, 2014 in New Zealand Application No. 602810.
NZIPO; Notice of Acceptance dated Aug. 28, 2014 in New Zealand Application No. 602810.
JPO; Translation of Office Notice of Reason for Preliminary Rejection dated Aug. 4, 2014 in Japanese Application No. 2013-521765.
JPO; Translation of Office Notice of Reasons for Final Rejection dated May 29, 2015 in Japanese Application No. 2013-521765.
USPTO; Office Action dated Feb. 24, 2014 in U.S. Appl. No. 13/653,680.
USPTO; Final Office Action dated Jun. 20, 2014 in U.S. Appl. No. 13/653,680.
USPTO; Advisory Action dated Sep. 3, 2014 in U.S. Appl. No. 13/653,680.
USPTO; Office Action dated Dec. 19, 2014 in U.S. Appl. No. 13/653,680.
USPTO; Office Action dated Dec. 30, 2014 in U.S. Appl. No. 13/653,680.
USPTO; Final Office Action dated Apr. 21, 2015 in U.S. Appl. No. 13/653,680.
USPTO; Notice of Allowance dated Oct. 22, 2015 in U.S. Appl. No. 13/653,680.
JPO; Office Action dated May 31, 2016 in Japanese Application No. 2015-191276.
CAIPO; Examination Report dated May 12, 2017 in CA Application No. 2796416.
CAIPO; Notice of Allowance dated Jan. 30, 2018 in CA Application No. 2796416.
EUIPO; Extended Search Report dated Jan. 7, 2016 in EP Application No. 11812871.9.
EUIPO; Notice of Acceptance dated Aug. 30, 2018 in EP Application No. 11812871.9.
ISA; International Search Report and Written Opinion dated Aug. 22, 2019 in PCT Application No. PCT/US2019/036548.
ISA; International Preliminary Report on Patentability dated Dec. 10, 2019 in PCT Application No. PCT/US2019/036548.
Notice of Allowance dated Jun. 15, 2022 in Japanese Application No. 2020-568501.

* cited by examiner

INK, TRANSFERS, METHODS OF MAKING TRANSFERS, AND METHODS OF USING TRANSFERS TO DECORATE PLASTIC ARTICLES

CROSS-REFERENCE TO RELATED APPLICATIONS

This application is a national stage application of PCT/US2019/036548 filed Jun. 11, 2019 and entitled "INK, TRANSFERS, METHODS OF MAKING TRANSFERS, AND METHODS OF USING TRANSFERS TO DECORATE PLASTIC ARTICLES", which claims priority to and the benefit of U.S. Provisional Patent Application Ser. No. 62/686,314 filed Jun. 18, 2018 and entitled "Ink, Transfers, Method of Making Transfers, and Method of Using Transfers to Decorate Polyolefin Articles," the disclosures of which are incorporated herein in their entirety for all purposes.

FIELD

This disclosure relates to a printed ink transfer system, printed ink transfers and methods of using the transfers to decorate plastic articles.

BACKGROUND

A large variety of articles are manufactured from polyolefin and other plastics through a variety of methods. The methods may include one or more of, for example, injection molding, rotational molding, blow molding, thermoforming, and extrusion. Although manufacturing various plastic articles may be relatively straightforward, permanently decorating them is challenging. For example, polyethylene and polypropylene plastics are non-polar and resist adhesive coatings that could be used to mark them with decorative indicia.

A common approach to decorating plastic articles has been to oxidize a surface of the plastic prior to performing a coating process. While oxidation has led to some success, the results are variable and the added processing step adds manufacturing cost.

Attempts to improve adhesion of labels to untreated plastic surfaces have included the use of heat activated labels, such as disclosed in U.S. Pat. No. 7,622,171. These labels are applied to the plastic articles in the form of transfers having an adhesive layer comprising a vinyl acetate resin, a tackifying resin, and a microcrystalline wax. However, this approach adhesively bonds the label only to the outer surface of the article. In other words, the label applied in this way is not part of the plastic, not integral to the article, but instead is attached like a decal on the surface of the plastic article where the label becomes subject to wear and eventual delamination.

A related problem with polyolefin articles produced in rotational molding processes was eliminated by using transfers printed with pigments or dyes mixed in oil or wax. The transfers are applied to the inside surface of the rotational mold where they are subsequently molded into the surface of the molded part during the rotational molding process. Also, similar transfers can be molded onto the surface of polyolefin parts, such as disclosed in U.S. Pat. Nos. 4,252,762; 4,519,972; 5,840,142; 6,613,830; 7,128,970; and 7,641,842. However, these methods are not compatible with high speed printing and decorating equipment and processes.

U.S. Pat. Nos. 8,349,917 and 9,296,243 teach a thermal transfer made by fusing a polyethylene based ink at temperatures greater than 250° F. onto a carrier sheet or film. Although the thermal transfer and thermal transferring process disclosed therein is an improvement over earlier teaching, the high temperature involved in the fusion process leads to stresses in the carrier film and an unacceptable shrinkage in the ink and film. These characteristics tend to make the transfer unstable and difficult to manufacture. Further, the tendency of the ink to split raggedly at the edge of a die during the process of hot stamping an image makes tipping embossed or raised sections of a part difficult. Also, transferred decoration may include "flash" from adjoining sections of ink. In view of these deficiencies, new inks, transfers and methods of making transfers, and methods of transferring indicia into the surfaces of plastic articles reliably and cost effectively are still needed.

SUMMARY

New inks, thermal transfers, methods of making thermal transfers, and methods of using thermal transfers for decorating plastic articles and for in-mold indicia transfer have now been discovered. These inks, transfers and methods substantially overcome these and other problems associated with the prior art. In particular, a new method has now been discovered to print thermal transfer ribbons, foils, and carrier sheets and papers, which are compatible with, and that can be fused into the walls of, molded plastic articles such as those comprising polyethylene, polypropylene, or other plastics. The improvements made over prior art thermal transfers and methods include, inter alia, addition of a fixing layer on a carrier film or paper which fixes the printed ink layer thereon, and use of lower temperature curing of the ink layer to prevent a co-mingling of the printed ink layer polyolefin or other plastic particles and the fixing layer, and to allow the use of heat-sensitive carrier films. In various embodiments, embossed stamping dies rather than flat stamping plates are used with foil not having design elements. In various embodiments, flat stamping platens are used to tip raised portions in preformed parts. These changes over the prior art mitigate the splitting of ink, the difficulty in tipping, and the flash from adjoining sections of ink.

In various embodiments, a thermal transfer is provided having an indicia layer which can be fused into the surface of a molded plastic article using various heat transfer processes.

In various embodiments, a thermal transfer is provided that can be used in heat and pressure applicators, such as hot stamp equipment or heat transfer equipment, conventionally used to apply labels to previously molded plastic articles such as preformed polyolefin articles. In various embodiments, a thermal transfer is provided that is applied to a plastic article with only an infrared heater or torch, without the need for (or reduced) pressure applied against the indicia transfer and the article to be decorated.

In various embodiments, a thermal transfer system is provided that can be used in an in-mold transfer process to fuse the transfer into the wall of a plastic article as the article is formed in a molding cycle, such as in injection molding and/or rotational molding.

In various embodiments, an ink is provided that can be used to form a thermal transfer foil or ribbon that can be used with thermal printing equipment to fuse indicia into the surface of plastic articles.

In various embodiments, a thermal transfer is provided that lends itself to decorating a raised image on a preformed plastic part.

In various embodiments, a thermal transfer is provided that lends itself to cleanly decorating a previously formed plastic part with a hot stamp die, whilst still being permanently fused to the part.

DETAILED DESCRIPTION

The detailed description of exemplary embodiments makes reference to the accompanying drawings, which show exemplary embodiments by way of illustration and best mode. While these exemplary embodiments are described in sufficient detail to enable those skilled in the art to practice the invention, it should be understood that other embodiments may be realized and that logical, chemical, and mechanical changes may be made without departing from the spirit and scope of the inventions. Thus, the detailed description is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Printing inks, transfers and methods of decorating polyolefin articles have been disclosed previously in U.S. Pat. Nos. 8,349,917 and 9,296,243, the disclosures of which are incorporated herein by reference in their entireties. The present disclosure details a substantial improvement over these patents, and solves the various problems mentioned above that were not previously appreciated. Further, the improvements disclosed herein allow for the decorating of preformed articles comprising plastics, wherein in various embodiments, the plastics may be other than polyethylene and polypropylene.

In various embodiments, new printing inks, thermal transfers, methods of decorating preformed plastic articles, and methods for in-mold indicia transfer are described. As detailed herein, the presence of a fixing layer (onto which an ink is printed) allows for use of a lower temperature fusion of inks onto carrier sheets in the curing step of a process of making thermal indicia transfers.

Definitions

As used herein, the term "ink" refers to a liquid to semi-liquid/paste composition comprising a dispersed additive, such as a pigment or dye or mineral, to impart opacity, color or physical properties to a coating formed by the ink. By definition the term includes the conventional pigmented or colored liquids or pastes used for printing. The term herein also encompasses a liquid or paste further comprising property enhancing additives, such as abrasion and flame resistant ingredients, amongst others.

As used herein, the term "indicia additive" refers broadly to constituents in an ink composition, including colorants, such as pigments and dyes, and any material capable of affecting at least one physical property of an ink or a coating produced from an ink, such as, for example, silica, mica, metal flakes, and the like.

As used herein, the terms "plastic article" or "plastic part" refer generally to pre-molded (i.e., previously molded or preformed) polyethylene, polypropylene or other plastic items. For example, certain plastic parts molded from copolymers of polyethylene or polypropylene, such as, ethylene/vinyl acetate and ethylene/butyl acrylate, may be decorated by the thermal transfers and methods disclosed herein. In various embodiments, a plastic part for decoration with indicia comprises crosslinked polyethylene ("PEX"). Non-limiting examples of polyolefin articles that may be decorated include municipal trash barrels and recycle bins, plastic signage, trays and crosslinked polyethylene tubing and pipe. Other plastic parts that may be decorated in accordance with the present disclosure comprise polyvinyl chloride (PVC), polytetrafluoroethylene (PTFE), various polyamides (e.g., Nylon-6, Nylon-11 or Nylon-12), polyester, and the like. As will be discussed in more detail, the inks printed on the thermal transfers herein have compositions that are compatible with the type of plastic found in the preformed part to be decorated.

As used herein, the term "polyolefin powder" refers to fine particulate polyethylene and/or polypropylene material used in the inks, having particle sizes from nanoscale up to micron scale. In various embodiments, finely powdered polyethylene having various particle size and bulk density ranges is used to make the inks herein, and may be obtained by mixing various grades of polyethylene powder, such as different density material. In various embodiments, polypropylene powder may be used, or blends of polyethylene and polypropylene powders may be used.

As used herein, the term "other plastic powder" refers to fine particulate plastic other than particulate polyethylene and polypropylene. Other fine particulate plastic constituents for the inks herein include, but are not limited to, polyvinyl chloride (PVC), polyamides such as Nylon-6, Nylon-11 and Nylon-12, polytetrafluoroethylene (PTFE), and polyester. As mentioned, one of the improvements over the prior art is the use of lower temperatures for curing of the ink on the transfer, and it is not necessary to melt the particulate plastic in the curing stage to produce the indicia transfer. Hence, these other types of plastics, some having melting points over 500° F., also find use in the inks disclosed herein. As per the polyethylene and polypropylene powders, the other plastic powders may have particle sizes from nanoscale up to micron scale and may be mixtures of different density materials in use. Choice of plastic powder for the inks herein is dictated, at least in part, by the type of plastic found in the preformed article to be decorated, and some advantages exist in using colored plastic particles, such as polyester powder.

As used herein, the term "fixing layer" refers to a composition of adhesive constituents mixed in a liquid vehicle, which can be coated onto a carrier film or paper. The fixing layer is coated onto the carrier sheet prior to coating the ink on to the carrier sheet, and thus the ink is printed onto the fixing layer that intervenes between the ink and the carrier film or paper. In this way, the fixing layer "fixes," or holds, the ink layer.

General Embodiments

Thermal Indicia Transfer Components
1. The ink:

In various embodiments, an ink herein comprises (a) polyolefin powder or other plastic powder; (b) an aliphatic or aromatic hydrocarbon solvent, or water; (c) an indicia additive; (d) a dispersing agent; and (e) optionally, a binder. The ink can be used to prepare a transfer having a decorative layer printed onto a fixing layer, previously coated on a carrier sheet, in a single printing step for monochromatic transfers, or in multiple printing steps for polychromatic transfers. The transfer may or may not include a final top coat of adhesive. In various embodiments, this adhesive can facilitate the transfer of the graphic from the carrier sheet onto the inside of a mold. Examples of such molds include rotational molds, injection molds, thermoform molds and blow molds.

(a) The Polyolefin Powder or Other Plastic Powder Component (i). Polyolefin Powder:

In various embodiments, a polyolefin powder comprises polyethylene powder.

The polyethylene powder in the ink comprises high density or ultra-high molecular weight polyethylene, having a density of from about 0.92 to about 0.97 gm/cc. The polyethylene powder may be used alone or in mixtures with lower density polyethylene having a density of from about 0.91 to about 0.92 gm/cc.

In various embodiments, the polyethylene powder has a mean particle size of from about 1 nanometer to about 150 microns. In more specific examples, the polyethylene powder has a particle size of from about 1 micron to about 150 microns.

In various embodiments, the ink is comprised of a mixture of polyethylene powder having different densities, such as a mixture of low and high density polyethylene powders, having an overall particle size range of from about 1 micron to 150 microns and having an overall density from about 0.90 gm/cc to about 0.95 gm/cc.

In various embodiments, the polyethylene powder is present in the ink in amounts ranging from about 15 to about 70 wt. %, from about 15 to about 45 wt. %, or from about 25 to about 45 wt. %, based on the total weight of the ink. In various embodiments, the polyethylene powder comprises a mixture of HDPE and LDPE at from about 40 wt. % to about 55 wt. %, based on the total weight of the ink.

(ii). Other Plastic Powder:

In various embodiments, the plastic particulate component of the ink may comprise some other plastic powder, either in addition to polyethylene and/or polypropylene, or in place of either or both. Selection of the plastic powder for the ink may be based, amongst other things, on the type of plastic in the preformed article to be decorated. In some instances, the plastic powder may be directly matched up with the plastic of the article to be decorated. In various embodiments, plastic powders for the inks herein include, but are not limited to, polyvinyl chloride (PVC), polyamides such as Nylon-6, Nylon-11 and Nylon-12, polytetrafluoroethylene (PTFE), and polyester. In various embodiments, any of these plastic powders may have an average particle size of from about 1 micron to about 150 microns.

PVC powder is available, for example, from Vinnolit GmbH & Co., KG, Ismaning, Germany. PVC powder typically has a bulk density greater than 1, such as for example, 1.4 gm/cc.

Polyamide powder is typically available as Nylon 6, 11 or 12 powders. In various embodiments, finely divided, small micron sized Nylon microspheres are used to create graphic transfers that can be heat-fused to Nylon plastics such as Nylon 6, Nylon 11 or Nylon 12. In specific examples, the polyamide powders for use herein have an average particle size of about 10 microns and a melting point of about 140-220° C. These materials are available, for example, from Toray Plastics, Tokyo, Japan.

Polytetrafluoroethylene (PTFE) is available as a fine powder from The Chemours Company, Wilmington, Delaware.

Polyester powder is typically designated either triglycidyl isocyanurate (TGIC) or "TGIC-free" polyester. These materials have a low cure temperature and are prevalent in the powder-coating industries. The availability of vividly colored polyester powder provides virtually unlimited possibilities for designing polychromatic indicia layers in the thermal transfers herein. Polyester powders that find use herein are available, for example, from IFS Coatings, Gainesville, Texas.

In various embodiments, particles sizes of these other plastics may be from about 1 to about 150 microns, from about 1 to about 100 microns, or from about 1 to about 10 microns. The plastic powder may be present in the ink in amounts ranging from about 15 to about 70 wt. %, from about 15 to about 45 wt. %, or from about 25 to about 45 wt. %, based on the total weight of the ink.

(b) The Aliphatic or Aromatic Hydrocarbon Solvent, or Water

In various embodiments, the mixture of polyolefin powder, colorants and/or other indicia additives are dispersed in an organic solvent or water which is sufficiently non-volatile at the coating or printing temperature of the ink. The solvent or water mixture should be sufficiently volatile, however, to be substantially totally removed from the ink coating with thermal treatment. In various embodiments, thermal treatment is conducted between the temperatures of about 90° F. and 240° F., and in other aspects, may be from about 130° F. to about 200° F. The temperature must remain below the fusion temperature of the polyolefin particles, which for polyethylene particles is about 250° F. Preventing the particles from fusing together when drying the ink helps prevent shrinkage of the coating.

In various embodiments, the solvent is present at from about 15 to about 45 wt. %, from about 25 to about 45 wt. %, or at about 30 wt. %, based on the total weight of the ink. In various embodiments, the hydrocarbon solvent is used at sufficient concentration to form a stable dispersion of the powdered polyolefin, which can be approximately equal parts powdered polyolefin and solvent.

(c) The Indicia Additive

In various embodiments, an indicia additive for use in an ink herein is stable at high temperatures, such as up to 500° F., such as necessary in applications where the ink will be fused into the wall of a plastic part at such temperatures. In various embodiments, the indicia additive may comprise any combination of pigments, fillers and/or colorants.

In various embodiments, the indicia additive comprises a colorant. In various embodiments, this colorant is a pigment, incorporated in the ink at sufficient wt. % to lend a color to a printed layer of the ink, which is perceptible to the unaided eye. Examples of such pigments for use herein include, but are not limited to, rutile titanium dioxide, zinc oxide, mixed iron oxides in hues such as yellow, brown, blue and black, lead chromates, cadmiums, carbon black, phthalocyanine pigments, ultramarine blues, and diketopyrrolopyrrole (DPP) organic pigments. Any other dye or pigment that is compatible with the plastic polymer particles in the ink and/or the plastic article to be decorated can also be used. As mentioned, some color effects may be achieved by using colored polyester powder in the ink, for example in concert with pigments or alone. In various embodiments, the ink does not comprise any colorant at all, or any colored plastic powder, and such an ink can be used to print a colorless coating.

The concentration of the colorant may vary by selection of the colorant and the color and opacity desired. In various embodiments, the concentration of colorant in the ink is from about 1 to about 45 wt. %, or from about 25 to about 35 wt. %, based on the total weight of the ink.

In various embodiments, the indicia additive comprises metal particles in the form of flakes or spheres, comprising aluminum, gold, or silver for example, to provide decorative metallic effects. The indicia additive may also comprise any one of aluminum zinc copper borate powders, metallic silver pigments, pearlescent and iridescent flakes of various metal carbonates, metal oxychloride, and titanium coated mica, and the like. In various embodiments, nickel and/or copper particles can be used to create electrically conductive layers fused to the surface of the plastic part.

In various embodiments, the indicia additive may comprise mineral particles such as feldspar, quartz, mica, hematite, magnetite, chromite spinel, rutile, talc, calcite, fluorite, apatite, orthoclase, corundum, silicon carbide, alumina, zirconium dioxide, ground glass, glass beads, fused silica particles, crystalline silica, calcium carbonate, bentonite clay, silica-alumina ceramics, or alkali alumino-silicate ceramics, or mixtures thereof. These particulate additives may be used to affect one or more physical properties of the ink, including visual properties, viscosity of the ink, and shrinkage of a printed layer of ink, and may be added to the ink in sufficient amounts as necessary to the change the property to the desired level. In various embodiments, the mineral additives may be present at from about 1 to about 10 wt. %, based on the total weight of the ink, in order to adjust the ink to a viscosity of from about 10,000 to about 20,000 cps suitable for screen printing.

In various embodiments, the total amount of indicia additive may be from about 1 to about 70 wt. % or from about 5 to about 45 wt. %, based on the total weight of the ink. In various embodiments, an ink may comprise from about 70-99% by weight filler particles to about 30-1% by weight plastic particles, such as polyolefin powder. In various applications, an ink coating may be more inorganic than organic polymer powder. Such ink coatings in the thermal transfer may be used to create low permeation coatings on fuel tanks. In some cases, the high degree of inorganic filler and small amount of polymer powder improves the binding of the indicia layer to the surface of the plastic part.

(d) The Dispersing Agent

A dispersing agent is used in the ink to facilitate dispersing the polyethylene powders and pigments in the hydrocarbon solvent or water. In various embodiments, a dispersant may be present in the ink at from about 0.05 to about 5 wt. %, from about 0.5 to about 5 wt. %, or from about 0.5 to about 2 wt. %, based on the total weight of the ink. In various embodiments, the dispersant is used at a concentration sufficient to disperse the polyolefin particles, colorants, additives and binders in the ink as a stable dispersion.

Numerous agents find use as dispersants herein, including rosin derivatives, fluorinated polyesters, acrylic resins, phosphate polyesters, ethyleneamines such as diethylenetriamine ethylenediamine, triethylenetetramine, tetraethylenepentamine, manganese soaps of distilled tall oil fatty acids, siloxanes and alkyl modified siloxanes. In certain examples, a succinimide dispersant is used in the ink composition, such as for example, the condensation product of a hydrocarbyl-substituted succinic anhydride or reactive equivalent thereof with an alkylene polyamine, as disclosed in U.S. Pat. No. 5,792,730.

(e) Optional Binders

A small amount of binder, such as, for example, about 1 to about 20 wt. %, or from about 2 to about 5 wt. %, based on the total weight of the ink, can be added to the ink to increase adhesion between the ink layer and the fixing layer. The binder is admixed with the mixture of polyolefin particles and pigment. Examples of suitable binders include hydrocarbon waxes such as microcrystalline or paraffin wax, hydrocarbon tackifying resins, and mineral oils. The binders must be compatible with the polyolefin particles and fuse together with them in the final heated fusion step with the plastic part. In all cases, the binder must be soluble or dispersible in the hydrocarbon solvent or water chosen for the coating.

2. The Fixing Layer:

In various embodiments, the fixing layer may comprise either (i) a combination of hydrocarbon resin and a synthetic rubber, or (ii) a silicone. Either type of fixing layer can be formed from a fixing layer composition comprising these base materials plus solvents and other materials, as explained below.

In various embodiments, the fixing layer is formed from a fixing layer composition comprising a solution of hydrocarbon tackifier resin mixed with a solution of synthetic rubber in a dissolving solvent. The hydrocarbon resin/synthetic rubber fixing layer composition may also include an aggregate as a way to obtain porosity in the fixing layer when coated, along with other optional additives, such as thixotropic agents.

In various embodiments, the hydrocarbon resin comprises an aliphatic resin having a molecular weight of about 360 g/mole, and a ring and ball softening point of about 85° C. In various aspects, the hydrocarbon resin is used at a weight percentage of from about 40 wt. % to about 55 wt. %, based on the total weight of the fixing layer composition. In various embodiments, the hydrocarbon resin is used at a weight percentage of from about 45 wt. % to about 50 wt. %, based on the total weight of the fixing layer composition. In more specific examples, the hydrocarbon resin is used at about 47.5 wt. %, based on the total weight of the fixing layer composition. Other tackifying resins, such as for example, rosin esters, terpene based resins, and C5 resins, can be used together or in any combination.

In various embodiments, the synthetic rubber used in the fixing layer comprises a block copolymer consisting of either a styrene-butadiene-styrene (SBS) or a styrene-isobutylene-styrene (SIS) unsaturated rubber midblock, or comprising a styrene-ethylene/butylene-styrene (SEBS) or styrene-ethylene/propylene-styrene (SEPS) saturated midblock. These may be used in a weight percentage of from about 1 wt. % to about 10 wt. %. These materials lend flexibility to the fixing layer. Other polymers, such as polyisobutylene and butyl rubber, may be used in place of the block copolymers to increase flexibility.

In various embodiments, the dissolving solvent for the fixing layer composition comprises an aromatic hydrocarbon solvent having an initial boiling point of about 160° C. Other hydrocarbon solvents, both aromatic and non-aromatic, such as for example, Stoddard solvent, toluene, xylene, Varnish Makers & Painters Naptha (referred to "VM&P Naptha") can be used alone, or in any combination, to cast the fixing layer. Other solvents such as poly dimethylcyclosiloxane (mostly comprising octamethylcyclotetrasiloxane, CAS #556-67-2), which are purportedly more environmentally friendly, can be used alone or in various combinations as well.

Additionally, a thixotropic additive such as fumed silica can be added to control viscosity and facilitate coating of the fixing layer on different equipment types. Fumed silica may be added in concentrations of from about 1 to about 5 wt. % to control viscosity of the fixing layer during application onto the carrier sheet.

Other additives can be added instead of the fumed silica, or in combination with the silica, to control certain physical properties such as viscosity or shrinkage of the fixing layer. Examples of additives include crystalline silica, glass spheres, ceramic spheres, bentonite clay, talc, mica, quartz, feldspar, magnetite, and silica-alumina particles. The one or more additives can be added in a total concentrations of from about 1 to about 70 wt. %.

Resistivity of the coating can be influenced by the addition of metal particles such as copper or nickel or silver to increase the conductivity of the coating.

Fillers such as glass spheres or ceramic spheres of from about 1 to about 200 microns can be added to increase the surface roughness of the fixing layer, and consequently, the receptivity of the fixing layer to the ink. Colorants such as pigments and dyes may also be added to tint or color the fixing layer regardless that the ink printed thereon may be colored.

The other type of fixing layer that finds use herein comprises a silicone instead of a hydrocarbon resin/synthetic rubber combination. In various embodiments, peroxide cured or addition cured silicone pressure sensitive adhesives may used solely as the fixing layer. In various embodiments, the silicone adhesive comprises a silicone resin dispersed in an aromatic solvent such as toluene. The material is then catalyzed by an addition cure chemical such as a platinum catalyst, or a benzoyl peroxide catalyst. The viscosity of the silicone adhesive can be modified with addition of fumed silica in an amount of about from about 1 to about 5 wt. %.

Each of the two types of fixing layer has its own advantages and characteristics. For example, the hydrocarbon resin/synthetic rubber fixing layer is less expensive than the silicone fixing layer, although the latter is better for higher temperature settings. Further, each type interacts differently with the ink layer when the ink layer is transferred off the carrier sheet, as explained below.

3. The Carrier Sheet:

Typical carrier sheets that can be used to receive the fixing layer coating as well as physically support the completed transfer include, but are not limited to, PET parchment paper, HDPE, LDPE, PP, vinyl, polystyrene, Kraft paper, poly-coated Kraft paper, and synthetic polyolefin papers, such as Teslin® (from PPG Industries). The fixing layer is printed and then cured or dried onto this substrate. The coating should remain adhered to the substrate during the rest of the manufacturing and printing steps. The lower temperature curing as described herein make it possible to use heat sensitive carrier films such as LDPE, HDPE, PP and vinyl, which tend to be more flexible and lower cost than PET sheets.

Methods of Manufacturing a Transfer
Coating the Fixing Layer onto the Carrier Sheet or Paper The fixing layer is coated onto the carrier sheet. Typical coating methods include screen printing, roll coating and gravure coating. Screen printing is an exemplary embodiment to coat the fixing layer. Typical viscosities of the fixing layer composition for screen printing are from about 2500 to about 10000 cps. Typical screen meshes are in the range of from about 60 to about 400 threads per inch. Typical screen fabrics include polyester, nylon and stainless steel.

In various embodiments, the fixing layer coating can be screen printed onto the carrier sheet using normal screen printing techniques. The resulting fixing layer coating is then cured at a temperature of from about 150° F. to about 300° F. for about 1-3 minutes. The fixing layer should have a dried film thickness of from about 0.25 mils to about 4 mils, or in various embodiments, from about 0.5 mils to about 2.5 mils.

After drying, the fixing layer remains sufficiently tacky to trap the ink particles and fix them to the sheet. The fixing layer, being adhesive in this way, is also microscopically porous so as to trap the particles within the body of the fixing layer rather than only fixing them on the surface. The three-dimensionally porous structure of the cured fixing layer can be achieved through various means including using an aggregate in the fixing layer coating to create roughness and coarse thread diameters as in the case of printing the fixing layer with a screen printing method.

Porosity can also be created by quickly drying the coating and causing incomplete wetting of the carrier sheet by the coating on the substrate. This porosity allows penetration of the ink into the fixing layer and allows it to adhere to the fixing layer coating even with minimal heating after printing of the ink layer. If the ink were to be printed on the carrier sheet without the benefit of the fixing layer, it would be removed easily like dust from a dry surface unless it were heated beyond the fusion temperature necessary to melt and co-mingle the plastic particles of the ink.

Applying the Ink to the Fixing Layer

In the second step of the transfer manufacturing, the ink is printed or coated in a desired decorative pattern onto the fixing layer. Appropriate coating techniques include screen printing, gravure printing, inkjet printing, and thermal transfer printing. After the ink is coated onto the fixing layer it is dried. The printed ink layer is dried at a temperature high enough to remove the hydrocarbon solvent from the ink layer, but low enough to prevent melting and fusion of the polyolefin or other plastic particles in the ink and to prevent any co-mingling of the polymeric particles with the fixing layer. In various embodiments, the ink coating is dried between the temperatures of about 90° F. and 240° F., and in other aspects, may be dried from about 130° F. to about 200° F. In various embodiments, drying is at less than 240° F. Cooler temperatures of drying are possible if conducted for longer drying times.

The fixing layer holds or traps the ink layer onto its surface and keeps it in place even though the plastic particles have not been melted.

The trapped particles of ink remain scuff resistant as they are adhered tenaciously to the fixing layer and within the porous structure of the fixing layer. The particles of plastic and pigment in the ink remain in the decorative design they were printed, and do not bleed into the fixing layer.

Depending on the composition of the fixing layer, the ink layer may transfer from the carrier sheet either with the fixing layer or without it after the fusion process. Thus, the choice of fixing layer may profoundly affect the type of finish one obtains for the decoration after it becomes integral with the molded part. Commercially available films are typically available in only a few finishes, e.g., matte, semi-gloss and gloss, and these few options may not match the finish of the previously molded part to be decorated if the finish of the film translates to the part. Therefore, it is desirable to be able to vary the finish of the decoration such that the finish of the decoration can be more closely matched to the finish of the previously molded part. In certain examples, it is desirable for the finish of the film not to transfer over to the part so as not to create mismatches in finish between the part and the decorative marking.

In particular, a fixing layer comprising hydrocarbon resin and synthetic rubber tends to transfer with the ink layer printed thereon, adhering and comingling after the fusion process used to transfer the decoration to the part. In this case, the decoration tends to keep the prior finish of the film, which as mentioned above may be commercially limited. Further, this system is somewhat less crisp on tipping. The phenomenon appears to result from a compatibility between the layers. Examples of compatible layers include, but are not limited to, hydrocarbon tackifying resins, hydrocarbon waxes, and low density polyethylene waxes.

The silicone-type fixing layer, on the other hand, tends to remain with the carrier sheet. That is, the ink layer and the silicone layer have a certain incompatibility that seems to promote separation between the ink layer and the fixing layer. In this case, the prior finish of the film does not translate to the part, giving the opportunity to adjust the finish of the decoration. Examples of incompatible layers include, but are not limited to, silicone, PVC, acrylic, epoxy, polyurethane, natural and synthetic rubber such as SBS and SBR based adhesives, and hot melt adhesives.

Use of the Transfer to Decorate Articles or for In-Mold Transfer of Indicia

A. Rotational Molding

In various embodiments, a method of transferring indicia onto a rotationally molded part comprises (a) adding a pressure sensitive adhesive layer to the transfer; (b) applying the transfer to an inside surface of the mold, with the pressure sensitive adhesive side against the inside surface of the rotational mold; (c) removing the carrier sheet; and (d) rotationally molding a part within the mold, wherein the graphic on the inside surface of the mold transfers to the part during the molding.

A transfer is first coated by a pressure sensitive adhesive which allows the transfer to be adhered to the inside surface of a rotational mold. The transfers with the adhesive layer are applied onto the inside surface of the rotational mold by pressing the transfer against the mold surface and then manually removing the graphic design from the carrier film by a squeegee or burnishing tool ensuring the graphic is adhered by the pressure sensitive adhesive to the mold. During the rotational molding cycle, the decorative indicia are subsequently transferred from the mold onto the surface of the part.

In a variation of the method, a pressure sensitive adhesive in applied over the top of the ink layer and dried. As mentioned, the adhesive allows for the adherence of the transfer to the mold surface during the molding process. After molding, the adhesive is then separated from ink, which is adhered to the part. The adhesive is cleaned off with an appropriate solvent that leaves the ink layer intact on the surface of the part.

B. Hot Stamping

1. Transfers are applied to the surface of preformed polyethylene or polypropylene parts with adequate heat, time and pressure to fuse them into the surface of the part. For this application, the transfers would often be printed on a continuous roll having uniformly spaced transfers. The transfers can be applied by a commercial, reciprocal press that receives a supply of molded parts across a stationary platen and that has a reciprocating and heated platen capable of being heated from about 250° F. to about 600° F. Attached to the platen is a die, such as made of aluminum and coated with a layer of silicone rubber.

The preformed plastic part is placed under the platen and the transfer is placed between the part and the die on the platen. The die is then compressed on the transfer and the part, for a time sufficient to fuse the transfer into the surface of the part and separate it from the carrier sheet.

In various embodiments, the dies are heated at from about 400° F. to about 550° F. Each compression of the platen lasts from about 0.1 seconds to about 1 minute. In various embodiments, compression duration is from about 0.5 seconds to about 10 seconds. The pressure needed at the die varies from about 75 psi to about 2000 psi, depending on the size of the part and the size of the transfer. In various embodiments, dies are shaped in an outline around the perimeter of the image transfer, typically 1 mm or larger than the image transfer.

2. In various embodiments of the method, preformed plastic parts with raised images or embossing may be colored by the application of a flat die onto a graphic transfer on only the raised portions of the part, (i.e., tipping of the raised portions). The ink in this case is overprinted as a single colored block or rectangle that covers the dimensions of the raised space on the part. The silicone die is also rectangular or square shaped and encompasses the raised portion of the part. The die is heated to a temperature of about 400° F. to about 550° F. The ink square is placed over the raised portion of the part and the die is then compressed over top of it for about 1 to about 5 seconds. The ink only transfers in the areas that are raised on the part. Since the particles of the ink are not fused together in the drying step in the process of making the transfer, no adjacent ink is transferred or carried onto the part, thus creating a clean image transfer the first time.

3. In a variation to the embodiment immediately previous, a square block, rectangle or continuous band of color supported on the carrier sheet may be used in accordance with a shaped die to stamp out a positive image on to the part. In this case, the die is also heated to about 400° F. to about 550° F. and is compressed on to the back of the carrier film and on to the plastic part for about 1 to about 5 seconds and at about 75 to about 2000 psi. The image of the die is positively stamped out of the carrier film and fused on to the plastic part. The die is removed from the surface and the carrier film is stripped off, leaving a clean image of the ink fused into the surface of the plastic. As before, since the particles of ink are not fused together on the carrier sheet, no adjacent material is transferred around the die image, allowing for clean separation.

C. Heat Application without Pressure

Transfers may be applied to the surface of preformed plastic articles with heat but without pressure. This application process is useful for decorating very large/bulky articles that wouldn't likely fit within the confines of a hot stamping machine. Examples of such articles include plastic storage tanks and other large vessels. For these bulky objects, a single transfer sheet may be adhered to the surface of the object, aided by an adhesive layer on the transfer or an adhesive later applied to the transfer or to the surface of the object. The transfer, temporarily held in this way with the adhesive, is then peeled apart to remove the carrier sheet but to leave behind the ink and fixing layers. This can be accomplished with a squeegee or a burnishing pad. After removal of the carrier sheet, the ink is fused into the surface of the plastic article by heating with an infrared lamp, a heat gun, or with the flame from a torch. The temperature of the plastic is raised quickly to the melting point of the surface of the article, typically about 250-400° F., and then is cooled quickly below the melting point. Enough thermal energy is applied in this process to fuse the graphic and the plastic part together.

D. In-Mold Decorating

1. In various embodiments, the ink and fixing layer are coated onto a polyolefin film, or synthetic paper such as LDPE, HDPE or polypropylene as the carrier. The drying techniques used should subject the films to no more than about 150° F. so they don't melt or distort during the manufacture of the transfer. The transfer film is cut, or die cut, to size and then placed into a mold. The film can be held in place with an adhesive, by a vacuum, or by static electricity. The transfer is over-molded into the part during the molding cycle. Since the ink and fixing layers are so compatible with the polyolefin film, they fuse into the films and resist delamination extremely well.

Other in-mold systems feature inks composed of acrylic, urethane or polyester type binders which are not compatible with polyolefin film. These inks tend to delaminate under the temperature and UV stresses of outdoor applications.

E. Printing and Coating as a Thermal Transfer Ribbon

In other embodiments, the ink and fixing layers are coated onto a PET film roll and used as an ink ribbon in traditional thermal transfer printing. Thermal transfer comprises a ribbon that contacts a print media and a corresponding image is heat transferred on to the print media. More specific embodiments in accordance with the present disclosure follow:

1. The ribbon and printer can be used to print onto print media comprised of a screen printed ink that is detailed above, with a fixing layer. The ink is subsequently fused at a temperature of 290° F. for a time sufficient to fuse the particles together, (e.g., about 10 seconds to about 2 minutes). This media is then passed through a thermal printer. The thermal printing ribbon comprises the fixing layer above, with the ink described above in an unfused state. The PET film should be about 0.5 to about 2 mils in thickness. The heated print head fuses the PE particles coated on the transfer ribbon onto the print media. His method is useful to print digital data such as barcodes, serial numbers, QR codes, and the like. It is also possible to use multiple ribbons coated in the CMYK format to print four color process artwork on the above described print media.

EXAMPLES

Example 1: Foil for Use with a Hot Stamp Die

This example illustrates the construction of a foil for use with a hot stamp die to decorate a previously molded polyolefin product. The construction was printed onto a roll of 2 mil thick PET film. The composition of the hydrocarbon resin-synthetic rubber type fixing layer used in this example is set forth in TABLE 1.

TABLE 1

Hydrocarbon Resin/Synthetic Rubber Fixing Layer Composition

| Approx. Weight % | Gram quantity | Ingredient |
|---|---|---|
| 42.2 | 95 | Hydrocarbon tackifying resin |
| 2.2 | 5 | Synthetic rubber |
| 44.4 | 100 | Aromatic 100 solvent |
| 11.1 | 25 | Fumed silica |
| 100% | 225 grams | |

The fixing layer composition of TABLE 1 was coated onto the PET film at a viscosity of about 3500 cps with a screen printing machine. The coating was then dried at a temperature of about 150° F. for about 45 seconds.

The printing ink used in this example is set forth in TABLE 2.

TABLE 2

Black Printing Ink Composition

| Approx. Weight % | Gram quantity | Ingredient |
|---|---|---|
| 36.8 | 300 | Odorless mineral spirits |
| 1.8 | 15 | Succinimide dispersant |
| 7.4 | 60 | Carbon black |
| 49.1 | 400 | HDPE micronized powder |
| 4.9 | 40 | Fumed silica |
| 100% | 815 grams | |

The ink of TABLE 2 was then screen printed at a viscosity of about 4000 cps onto the fixing layer previously applied to the PET film. The ink thus printed was dried at a temperature of about 150° F. for about 45 seconds.

The resulting construction was fed into a hot stamp press via a roll-to-roll unwinder and rewinder apparatus. The hot stamp machine was fitted with a shaped aluminum die that was in the pattern of the image to be stamped. The die was heated to a temperature of about 350° F. and a polyethylene plastic part to be decorated was placed under the die and roll of film. The machine was engaged with the die contacting the film, which in turn contacted the plastic part for about 2 seconds. The die was retracted and the film was pulled off the part by the rewinder apparatus. The ink and fixing layer from the construction were removed from the PET film and transferred to the plastic part in the image of the die. This transferred image was permanent and was observed to be integral to the plastic part.

Example 2: A Multicolor Transfer

In this example, a multicolor transfer was manufactured using the fixing layer composition of TABLE 1 and the black ink of TABLE 2, in addition to a white ink. In the first step of the process, the fixing layer composition of TABLE 1 was coated and dried on a 3 mil thick PET film as per Example 1. In the next step, a patterned stencil was used on a screen printing machine to apply a first layer of the above-described black ink of TABLE 2 onto the fixing layer. Following black ink printing, a second screen with an adjoining pattern was aligned over the printed construction. This pattern was screened with a white ink having the composition of TABLE 3.

TABLE 3

White Printing Ink Composition

| Approx. Weight % | Gram quantity | Ingredient |
|---|---|---|
| 30.24 | 300 | Odorless mineral spirits |
| 1.21 | 12 | Succinimide dispersant |
| 25.21 | 250 | Titanium dioxide |
| 40.32 | 400 | HDPE micronized powder |
| 3.02 | 30 | Fumed silica |
| 100% | 992 grams | |

The white ink composition of TABLE 3 was coated next to the black ink layer and also onto the fixing layer at a viscosity of about 4000 cps. It was dried at a temperature of about 150° F. for about 45 seconds. The resulting construction was fed into a hot stamp machine and under a rectangular aluminum die. The die was coated with a ¼ inch layer of silicone rubber and was about ¼ inch larger than the printed image on the PET film. A polyethylene part was placed under the die and the roll of film. The machine was engaged whereby the die contacted the back of the film for about 3 seconds. The die was then retracted and the film stripped from the surface of the plastic part. The fixing layer and both the white coating and the black coating were fused into the plastic part and were deemed to be permanent and integral to the part.

Example 3: Transfer to the Inside of a Mold

In this example, the fixing layer composition of TABLE 1 was used again, coated and dried onto a 3 mil PET film as per Example 2. The black and white ink layers described in TABLES 2 and 3, respectively, were coated and dried in succession on the fixing layer as per above. At this point, the fixing layer and the overlaying white and black ink layers were coated with a silicone PSA. This layer was dried and cured at a temperature of about 275° F. for 1 minute. The resulting construction was then placed face down on the inside surface of a rotational mold, a blow mold, an injection mold, or a vacuum-forming mold. Using a squeegee, and by pressing against the back of the film, the image was adhered to the inside surface of the mold by the PSA. The carrier film was then stripped off from the mold and removed altogether. The part was then molded using the normal molding techniques appropriate for the type of mold chosen, and then the molded part was cooled. The image construction was transferred into the wall of the polyethylene part during the molding process to become part of the surface. The part having the image fused into the surface was then removed from the mold, and there was no evidence of any portion of the transfer remaining in the mold.

Example 4: Tipping

In this example, the fixing layer composition of TABLE 4 was used.

TABLE 4

Silicone Fixing Layer Composition

| Approx. Weight % | Gram quantity | Ingredient |
|---|---|---|
| 43.48 | 100 | Silicone PSA |
| 43.48 | 100 | Toluene |
| 13.04 | 30 | Fumed silica |
| 100% | 230 grams | |

The fixing composition of TABLE 4 was printed on conventional screen printing equipment at a viscosity of about 4000 cps onto a roll of 2 mil film. The coating was dried and cured at a temperature of about 275° F. for about 1 minute. Following curing of the fixing layer, the black ink composition of TABLE 2 was screen printed onto the fixing layer as per Example 1. The black ink layer thus printed was dried at a temperature of about 150° F. for about 45 seconds. The resulting construction was then fed into a hot stamp machine. A plastic part with raised lettering was positioned in the hot stamp machine under a heated die as described in Example 2. The machine was engaged and the die was brought into contact with the back of the film for about 4 seconds. The die and the film at that point were only in contact with the raised lettering on the part and not with the main surface of the part. The die was then retracted and the film together with the fixing layer were stripped away from the plastic part. The result was black ink transferred to the raised portions of the plastic part. The ink was fused permanently into the part and was integral to the part.

Example 5: In-Mold Labeling after Printing on a Film

In this example, a plastic film having similar characteristics to a molded plastic part to be molded was used as the carrier film. Films such as HDPE, LDPE, and PP can be used. A 4 mil thick film of LDPE was printed with the hydrocarbon resin/rubber fixing layer composition of TABLE 1, coated and then cured as per Example 2. The resulting fixing layer was then overprinted with the same coatings and techniques as per Example 2. The entire construction was then die cut out and placed into a mold. The film and ink construction was held in the mold by various techniques includes vacuum, static or by adhesives. The mold was closed and the part molded therein. After the part was molded and cooled, the part was de-molded and the film and ink construction were found adhered to the part. The ink was deemed to be permanently bonded to the film such that it could not readily separate from it.

Inks, transfers and methods of decorating plastic articles are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described various embodiments that are known to those of ordinary skill in the art are expressly incorporated herein by reference and are intended to be encompassed by the present claims. Moreover, it is not necessary for a composition or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a chemical, chemical composition, process, method, article, or apparatus that comprises a list of elements does not include only those elements but may include other elements not expressly listed or inherent to such chemical, chemical composition, process, method, article, or apparatus.

We claim:

1. A method of manufacturing a transfer, the method comprising:
   coating onto a carrier sheet or film a fixing layer composition;
   thermally curing the fixing layer composition;
   printing an ink on the fixing layer composition, the ink comprising: (a) at least one powdered plastic; (b) a solvent having sufficient volatility for substantially total removal at a temperature of less than about the melting temperature of the powdered plastic; (c) an indicia additive; (d) a dispersing agent; and (e) optionally, a binder; and
   drying the ink on the fixing layer composition at a temperature less than about the melting temperature of the powdered plastic to produce the transfer.

2. The method of claim 1, wherein the fixing layer composition comprises a hydrocarbon tackifier resin, a synthetic rubber, a solvent, an optional aggregate, and optional additives.

3. The method of claim 1, wherein the fixing layer composition comprises a silicone.

4. The method of claim 1, wherein the fixing layer composition is thermally cured at from about 150° F. to about 300° F. for about 1-3 minutes.

5. The method of claim 1, wherein the fixing layer thus coated on the carrier sheet or film has a dried film thickness of from about 0.25 mils to about 4 mils.

6. The method of claim 1, wherein the ink is dried on the fixing layer composition at a temperature of about 130° F. to about 200° F.

* * * * *